United States Patent [19]
Dent

[11] Patent Number: 5,995,547
[45] Date of Patent: Nov. 30, 1999

[54] METHOD AND APPARATUS FOR MAPPING BETWEEN CELLULAR BIT STREAMS AND WIRELINE WAVEFORMS

[75] Inventor: Paul W. Dent, Pittsboro, N.C.

[73] Assignee: Ericsson Inc., Research Triangle Park, N.C.

[21] Appl. No.: 08/757,051

[22] Filed: Nov. 26, 1996

[51] Int. Cl.⁶ .................................................. H04B 14/04
[52] U.S. Cl. ........................ 375/242; 370/401; 455/557; 455/561
[58] Field of Search ..................................... 375/242, 222; 370/338, 353, 466, 401, 493, 494, 495; 455/422, 557, 558, 561, 93, 142

[56] References Cited

U.S. PATENT DOCUMENTS

| | | | |
|---|---|---|---|
| 4,479,213 | 10/1984 | Galand et al. | 370/477 |
| 5,341,401 | 8/1994 | Farjh et al. | |
| 5,386,590 | 1/1995 | Dolan | 455/557 |
| 5,438,700 | 8/1995 | Hashimoto et al. | 455/557 |
| 5,463,477 | 10/1995 | Kakizaki | 455/557 |
| 5,465,267 | 11/1995 | Todoroki | |
| 5,479,475 | 12/1995 | Grob et al. | 370/349 |
| 5,479,480 | 12/1995 | Scott | 455/557 |
| 5,694,428 | 12/1997 | Campana, Jr. | 375/260 |
| 5,722,054 | 2/1998 | Mizutani et al. | 455/88 |
| 5,787,088 | 7/1998 | Dagdeviren et al. | 370/493 |

FOREIGN PATENT DOCUMENTS

| | | |
|---|---|---|
| WO 93/08667 | 4/1993 | WIPO . |
| WO 93/15570 | 5/1993 | WIPO . |
| WO 96/27963 | 12/1996 | WIPO . |

*Primary Examiner*—Nguyen Vo
*Assistant Examiner*—Congvan Tran
*Attorney, Agent, or Firm*—Jenkens & Gilchrist, P.C.

[57] ABSTRACT

A method and apparatus for mapping a cellular bit stream to a wireline modem waveform is disclosed. A received cellular bit stream is applied to convolutional decoder to decode class I speech bits within each bit frame of the cellular bit stream. The decoder speech bits are appended to the bit frame from which the decoded bits came, and a 40 bit frame marker is attached to each bit frame. This modified bit frame is transmitted at 20 mS intervals to a wireline modem to achieve a 19.2 KB/S bit rate. The line modem maps the signal onto a waveform and transmit the signal to a PSTN network.

14 Claims, 3 Drawing Sheets

METHOD AND APPARATUS FOR MAPPING BETWEEN CELLULAR BIT STREAMS AND WIRELINE WAVEFORMS

BACKGROUND OF THE INVENTION

1. Technical Field of the Invention

The present invention relates to cellular radio communications, and more particularly, to a method and apparatus for converting between a cellular bit stream and a wireline modem waveform.

2. Description of Related Art

Wireline networks are currently defining new services based upon Integrated Service Digital Network's (ISDN's) flexible standards for delivering direct digital interfaces for subscribers in a variety of bit rates. These variety of bit rates cannot be directly mapped to wireless services without an as yet undefined compression technique because of the premium placed on efficient radio spectrum utilization.

One proposed method of providing maximum flexibility for future mapping between wireline waveforms and cellular bit streams involves defining a transparent mode in which all data bits of, for example, the IS54 format totaling 13 KB/S are mapped to a PSTN subscriber using a suitable wireline modem waveform for greater than 13 KB/S, for example, 19.2 KB/S. The IS54 channel and speech coding and decoding could be remotely located at the mobile switching center (MSC) or even a private address branch exchange (PABX).

However, this method only involves mapping "hard" bit (class I speech bit) decisions from the IS54 signal. By mapping only "hard" bit decisions from IS54 to wireline, the "soft" bit information that is valuable in performing an alternative error correction decoding for data would be discarded. The "soft" bit information is accessible only in the vicinity of the base station receiver's demodulator, unless the bit rate between the receiver and the wireline is increased substantially to preserve the soft information. This suggests that channel decoding of the convolutionally coded speech bits should be performed at the transceiver for both voice and data nodes in order to benefit from the "soft" bit information to achieve best performance. Thus, a method for converting between a cellular bit stream and a wireline modem waveform is needed which preserve the benefits of "soft" error correction decoding for both voice and data.

SUMMARY OF THE INVENTION

The present invention overcomes the need to transmit soft information between the cellular receiver and a remote data modem. A received signal may comprise coded voice in which a fraction of the bits are convolutionally encoded (class I bits) and the remainder (class II bits) are not. Alternatively, the received signal may comprise convolutionally encoded data in which all bits are coded. The inventive wireless/wireline interface comprises simultaneous soft-decision decoding of received signals in a first way adapted to the voice coding method and in a second way adapted to the data coding method. The result of decoding in both ways includes decoded class I bits, hard-decisions for the class II speech bits, and decoded data bits. All decoded bits are multiplexed into a suitable wireline modem protocol, for example, 19.2 KB/S, and transmitted to a remote Interworking Unit.

The Interworking Unit processes the decoded class I speech bits and the decoded data bits to form a speech/data decision. If the "speech" decision is made, the class I and class II bits are processed in a speech coder to regenerate analog or pulse code modulated (PCM) speech. Alternatively, if the "data" decision is made, the decoded data bits, which may include the class I bits, are passed to a data terminal.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
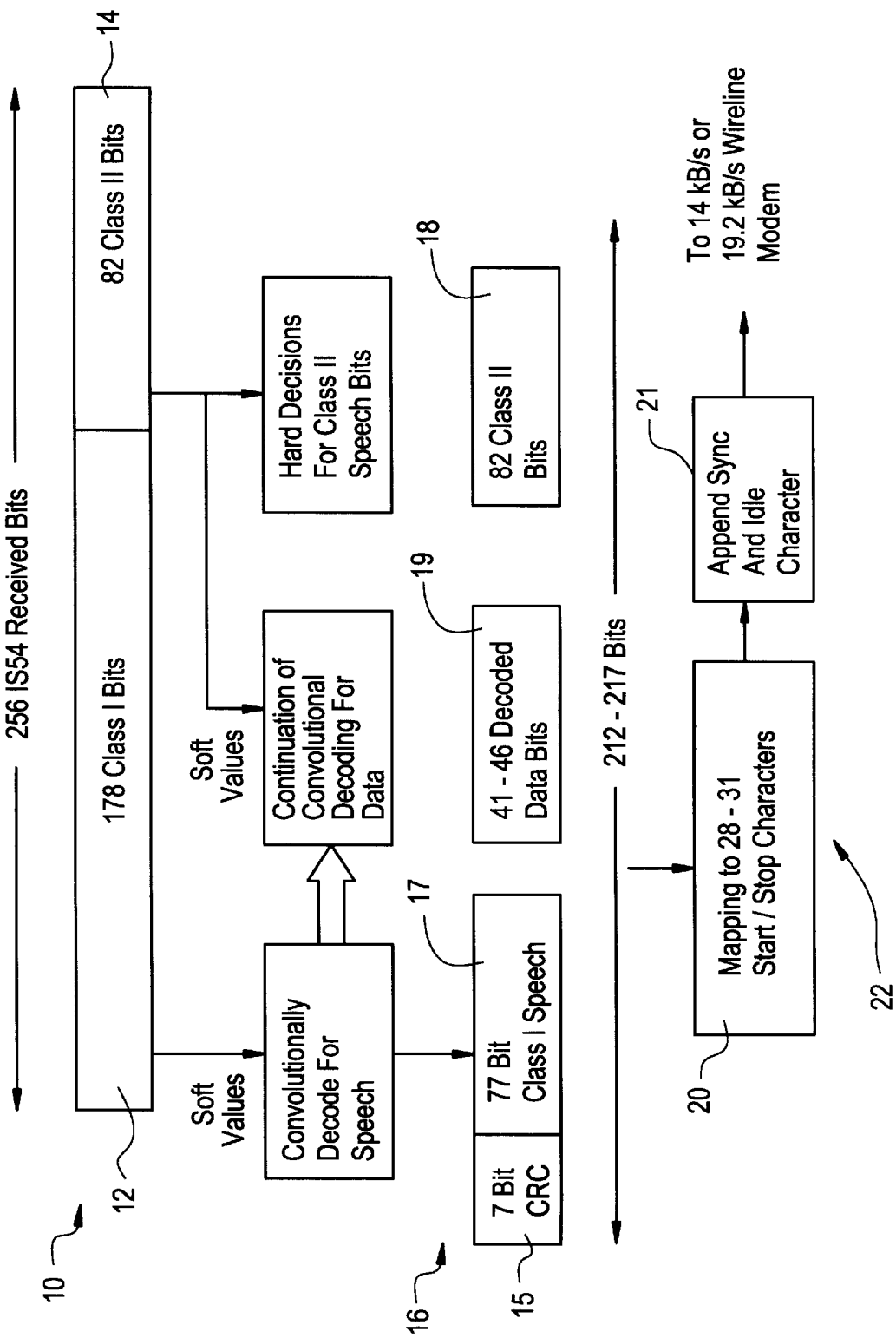
FIG. 1 is a block diagram illustrating the conversion of a bit frame received from the cellular data bit stream to a form for mapping to a wireline waveform.

Referring now to the drawings, and more particularly to FIG. 1, there is illustrated the manner in which a bit frame from a cellular bit stream is converted into a form sufficient for mapping onto a wireline modem waveform. Initially, a bit frame from a cellular data bit stream is received by a base station receiver. The bit frame as originally received comprises a block of 260 bits 10. The first portion 12 of the bit frame consists of 178 bits of data comprising the class I speech bits or "important" data. Of the remaining data, eighty-two bits comprise the class II speech bits 14 or "unimportant" speech data consisting of nonconvolutionally encoded data bits. The receiver produces output prior to decoding which is not quantized to binary 1's or 0's, but exists in a "soft" form in which signal values lie between 0 values and 1 values.

The class I speech bits are convolutionally decoded to generate eighty-four decoded bits 16. The convolutional decoder inputs 178 "soft" values from the receiver, but outputs "hard"1's and 0's. These eighty-four "hard" output bits 16, in the case of speech, consist of seven cyclic redundancy check (CRC) bits 15 and seventy-seven "hard" data bits 17. The speech decoding process also comprises making "hard" decisions on the 82 class II bits 18 received in "soft" form by the receiver. This is done just by determining whether the "soft" value is closest to a "1" or a "0" value. The 82 hard-decision class II bits 18 are then appended to the 84 decoded class I bits 16.

If however, the received signal was a convolutionally coded data signal in which all 260 received bits 10 represent coded data, then the 82 hard-decision class II bits 18 should have been convolutionally decoded to obtain forty-one further decoded bits 19, assuming the same coding rate of ½. In principle, the 82 bits may be subjected to a rate ½ decoding process, but the benefit of the soft information is not obtained if hard decisions have already been taken.

According to the invention, therefore, the convolutional decoder does not stop decoding after processing the 178 coded class I bits, but continues to decode all 260 soft received values to obtaining approximately 130 decoded bits (16 and 19). In practice, the number of decoded bits may be less than 130 if the technique known as "tail bits" is employed to terminate the decoding operation, but this is a detail immaterial to the invention.

Thus, on the assumption that a speech signal was received the decoder outputs 84 decoded Class I bits 16 and 82 hard-decision Class II bits 18. Additionally, on the assumption that a data signal was received the decoder also outputs a further 41–46 decoded bits 19. The five extra bits are the boundary between the first 84 decoded bits 16 and the last 46 decoded bits 19. Therefore, the decoder outputs 84+82 speech bits, 41 additional decoded data bits and 5 optional data bits depending on whether the same tail-bit strategy is used for voice and data coding and decoding. The above 212–217 bits occur every 20 mS of a digital cellular frame period, making a total bit rate of 10.24–10.34 KB/S that is 280–384 bits per 20 mS, thus, allowing room for appending a sync pattern to indicate the start and end of the 212–217 bit data blocks.

Using asynchronous start/stop wireline protocols, data for transmission is assembled into characters 20 including a start bit, a stop bit and, optionally, a parity bit. A character is effectively 10 bits long, but only contains eight bits of data (if no parity bit is used) or seven bits of data (if a parity bit is used).

The 212–217 bits for transmission are assembled using a multiplexor into seven or eight bit bytes, giving either 31 characters (with parity) or 28 characters (without parity) per 20 mS time period. A 14 KB/S modem stream can be used with no spare space for sync characters. A sync function may be provided by noting that 217 divided by eight is 27 with 1 bit left over, so 28 characters 20 can accommodate seven bits of a known sync pattern per 20 mS frame. When parity is used, 31 characters 20 per 20 mS are generated and cannot be accommodated within a 14 KB/S modem rate, but, may be accommodated within a 19.2 KB/S modem rate. At 19.2 KB/S, the number of characters per 20 mS period is a maximum of 38. The asynchronous start/stop format is then useful for absorbing the 0.4 fractional character period that is not able to be utilized.

Thus, a possible protocol comprises transmitting 32 characters 20 comprising 31 data-bearing characters and one sync character 21 per 20 mS time period using a 19.2 KB/S wireline modem. The six (+0.4) characters of unused capacity are left blank or idle. The sync character 21 acts as a 20 mS time frame marker indicating the amount of data to be transmitted during each 20 mS period to the wireline modem. The 20 mS transmission time provides a gross wireline bit rate of 19.2 KB/S for mapping to a waveform generated by the wireline waveform.

The modified bit frame 22 consists, for example, of 32, 7-bit characters transmitted every 20 mS to yield the 19.2 KB/S bit rate. This procedure enables a transparent, uncoded transfer of bit stream data while providing maximal flexibility to define future digital data services while preserving access to "soft" decoded speech (and data) bits for best error performance. The transmitted modified bit frames 20 are received at a wireline modem where they are mapped to a waveform.

Figure 2:
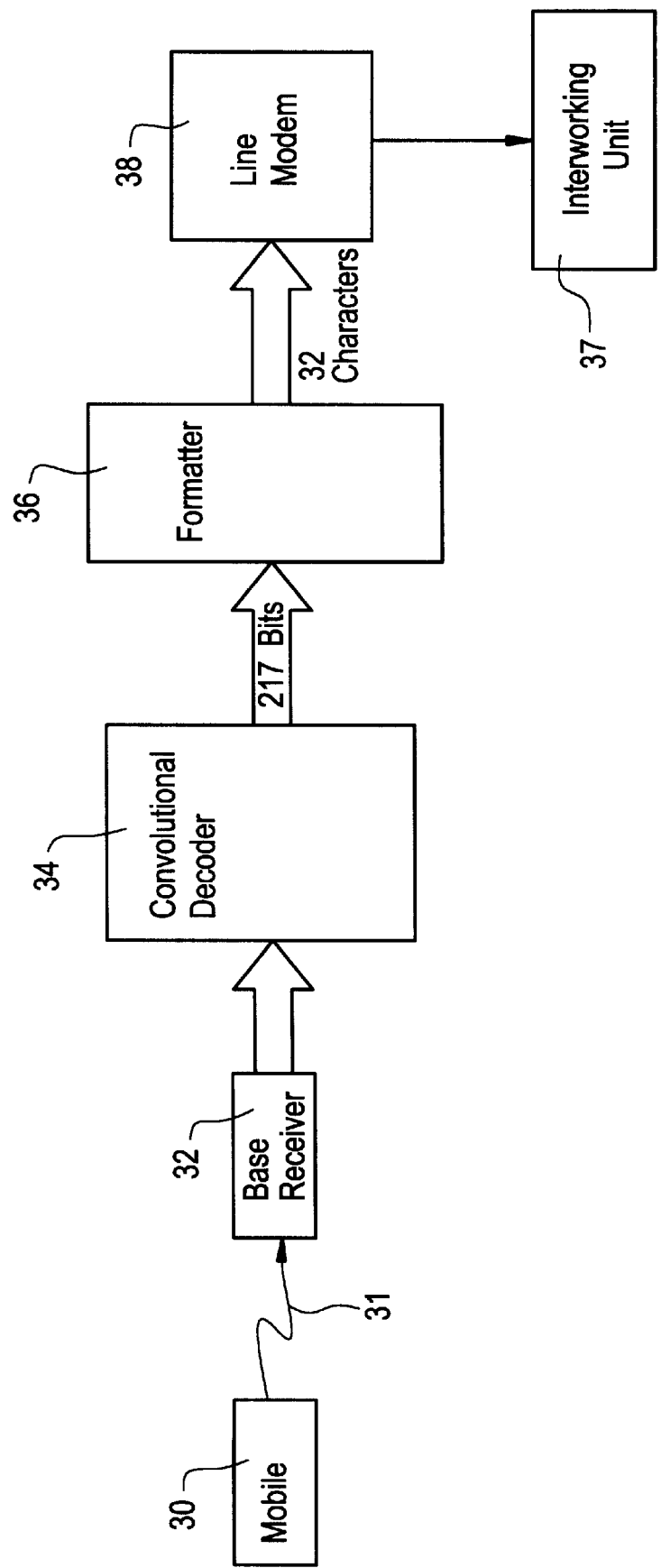
FIG. 2 is a block diagram illustrating a rate adapter for converting a cellular bit stream into a wireline modem waveform.

Referring now to FIG. 2 there is illustrated a block diagram of a rate adapter enabling mapping of a cellular bit stream to a wireline modem waveform. The cellular bit stream transmitted from a mobile telephone unit 30 through radio interface 31 to a base station receiver 32. The bit stream is fed to a convolutional decoder 34 that performs a convolutional decoding on the class I speech data within a bit frame 10 to extract the convolutionally encoded class I speech data and convolutionally decoded data in the manner described previously with respect to FIG. 1. The convolutional decoder 34 provides 84 decoded class I speech bits, 82 class II speech bits and typically 51 other bits that may represent decoded data. The 217 bits are fed to multiplexor 36 which adds sync bits or characters as necessary and generates preferably a constant number of start/stop characters per 20 mS period. The start/stop characters from multiplexor 36 are then transmitted to Interworking Unit 37 by wireline modem 38.

The Interworking Unit 37 processes the decoded class I speech bits and the decoded data bits to form a speech/data decision. If the "speech" decision is made, the class I and class II bits are processed in a speech coder to regenerate analog or PCM speech. Alternatively, if the "data" decision is made, the decoded data bits, which may include the class I bits, are passed to a data terminal.

Figure 3:
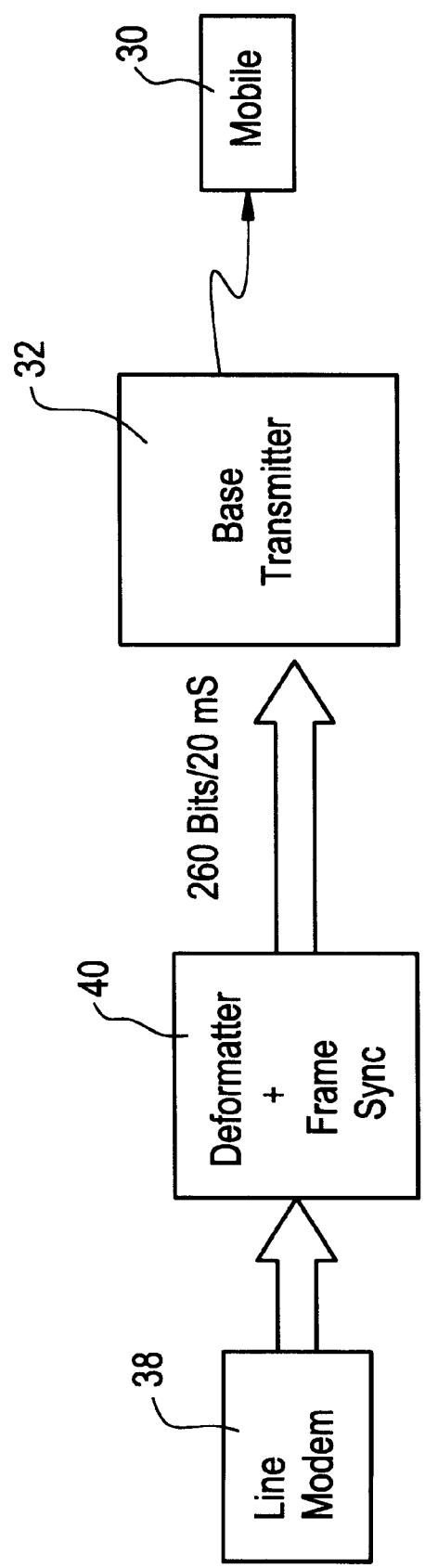
FIG. 3 is a block diagram illustrating a rate adapter for converting a wireline modem waveform into a cellular bit stream.

Referring now to FIG. 3 there is illustrated a block diagram of another embodiment of the rate adapter for converting an analog wireline modem waveform to a cellular bit stream for transmission to a mobile unit 30. The line modem 38 receives 19.2 KB/S waveform from a PSTN network. Modem 38 demodulates and transfers the received signal to a deformatter and frame sync unit 40. The deformatter and frame sync unit 40 locates each 20 mS frame of characters and extracts therefrom 260 bits of information to be placed in the data field of an IS54 or IS136 TDMA burst that is then transmitted by base station 32 to mobile unit 30. The mapping in this direction is more straight-forward as the problem of "soft" information does not arise for the base station transmitter.

Although an embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. An apparatus for converting between wireless and wireline signals comprising:

first means for transmitting and receiving wireline signals;

second means for transmitting and receiving wireless signals; and means, connected between the first and second means for transmitting, for mapping between wireline and wireless signals in response to receipt of a signal at the first or second means for transmitting, said means for mapping, comprising:

a first portion for mapping a wireless signal to a wireline signal, comprising:

means for decoding coded speech bits from any speech signal within the wireless signal and for decoding coded data bits from any signal within the wireless signal;

means for demodulating the wireless signal to reproduce any uncoded bits within the wireless signal;

means for combining the decoded speech bits with the decoded data bits and the uncoded bits into a bit stream for wireline transmission; and means for transmitting the bit stream as a wireline signal;

a second portion formatting a wireline modem signal to a wireless signal, comprising:

means for demodulating a received wireline signal;

means for extracting data from the wireline signal;

means for formatting the extracted data into a burst frame of a wireless signal; and a network base station for modulating the burst frame of the wireless signal for transmission.

2. An apparatus for mapping a wireless signal received at a network base station to a wireline modem signal, compromising:

means for decoding coded speech bits from any speech signal within the wireless signal and for decoding coded data bits from any signal within the wireless signal;

means for demodulating the wireless signal to reproduce any uncoded bits within the wireless signal;

means for combining the decoded speech bits with the decoded data bits and the uncoded bits into a bit stream for wireline transmission; and means for transmitting the bit stream as a wireline signal.

3. The apparatus claim 2 wherein the means for combining further attaches a frame marker to the bit stream at intervals corresponding to a bit frame repetition rate of the wireless signal.

4. The apparatus of claim 3 wherein the bit frame repetition rates is a multiple of 20 mS.

5. The apparatus of claim 2 wherein the means for combining further appends bits to the bit stream to achieve a fixed number of bits.

6. The apparatus of claim 2 wherein the means for decoding decodes convolutionally coded data.

7. The apparatus of claim 2 wherein the means for decoding operates at a frame repetition rate characteristic of the wireless signal.

8. The apparatus of claim 2 wherein the means for transmitting transmits symbols at the standard wireline symbol rate of 14.4 kilobauds.

9. The apparatus of claim 2 wherein the means for transmitting transmits symbols at the standard wireline symbol rate of 19.2 kilobauds.

10. A system for converting voice and digital data from a wireline signal to a wireless signal, comprising:

means for demodulating a received wireline signal;

means for decoding coded speech bits from any speech signal within the wireline signal and for decoding coded data bits from any signal within the wireline signal;

means for formatting the decoded data into a burst frame of the wireless signal, wherein the means for formatting operates at a repetition period characteristic of the wireless signal; and a network base station for modulating the burst frame of the wireless signal for transmission.

11. A method for mapping a wireless signal to a wireline modem signal, comprising the steps of:

decoding the wireless signal to reproduce any coded speech bits and data bits from the wireless signal;

decoding the wireless signal to reproduce any uncoded bits within the wireless signal;

combining the decoded speech bits, decoded data bits and uncoded bits into a bit stream signal;

transmitting the bit stream as a wireline signal.

12. The method of claim 11 further including the step of attaching frame markers to the bit stream at intervals corresponding to a bit frame repetition rate of the wireless signal.

13. The method of claim 11 further including the step of appending bits to the bit stream to achieve a fixed number of bits.

14. A method of mapping a wireline signal to a wireless signal, comprising the steps of:

demodulating a received wireline signal;

decoding any coded speech bits from a speech signal within the wireline signal;

decoding any coded data bits from any signal within the wireline signal:

formatting the decoded data into burst frames of a wireless signal, wherein the step of formatting operates at a repetition period characteristic of signals used in a wireless connection; and modulating the burst frames for transmission on the wireless connection.

* * * * *